United States Patent [19]

Hoffman et al.

[11] Patent Number: 5,343,330

[45] Date of Patent: Aug. 30, 1994

[54] DOUBLE REFRACTION AND TOTAL REFLECTION SOLID NONIMAGING LENS

[75] Inventors: Marc Hoffman, St-Lambert; Georges P. Dick, Verdun, both of Canada

[73] Assignee: Rousseau Sauve Warren Inc., Montreal, Canada

[21] Appl. No.: 33,794

[22] Filed: Mar. 18, 1993

Related U.S. Application Data

[63] Continuation-in-part of Ser. No. 765,191, Sep. 25, 1991, abandoned.

[51] Int. Cl.$^5$ ............................................. G02B 3/02
[52] U.S. Cl. ........................................ 359/708; 359/726; 359/737
[58] Field of Search ................ 359/708, 737, 726, 730, 359/831, 837, 727, 728, 387, 857, 654, 655

[56] References Cited

U.S. PATENT DOCUMENTS

| | | | |
|---|---|---|---|
| 1,348,618 | 8/1920 | Zorger. | |
| 1,977,689 | 10/1934 | Müller | 177/329 |
| 2,254,961 | 9/1941 | Harris | 240/106.1 |
| 2,254,962 | 9/1941 | Harris et al. | 240/106.1 |
| 2,469,080 | 5/1949 | Rosin et al. | 240/106.1 |
| 2,908,197 | 10/1959 | Wells et al. | 88/1 |
| 3,307,175 | 2/1967 | Shill | 340/380 |
| 3,923,381 | 12/1975 | Winston | 350/293 |
| 3,957,031 | 5/1976 | Winston | 126/270 |
| 4,002,499 | 1/1977 | Winston | 136/206 |
| 4,003,638 | 1/1977 | Winston | 350/293 |
| 4,013,915 | 3/1977 | Dufft | 313/499 |
| 4,109,304 | 8/1978 | Khvalovsky et al. | 362/259 |
| 4,211,955 | 7/1980 | Ray | 315/53 |
| 4,271,408 | 6/1981 | Teshima et al. | 340/702 |
| 4,298,869 | 11/1981 | Okuno | 340/782 |
| 4,521,835 | 6/1985 | Meggs et al. | 362/183 |
| 4,630,183 | 12/1986 | Fujita | 362/311 |
| 4,654,629 | 3/1987 | Bezos et al. | 340/87 |
| 4,657,353 | 4/1987 | Clegg | 350/432 |
| 4,698,730 | 10/1987 | Sakai et al. | 362/311 |
| 4,727,289 | 2/1988 | Uchida | 315/71 |
| 4,729,076 | 3/1988 | Masami et al. | 362/235 |
| 4,851,824 | 7/1989 | Murata | 340/701 |
| 4,851,832 | 7/1989 | Graf | 340/907 |
| 4,939,426 | 7/1990 | Menard et al. | 315/192 |
| 4,954,822 | 9/1990 | Borenstein | 340/925 |
| 4,965,488 | 10/1990 | Hibi | 313/499 |
| 5,001,609 | 3/1991 | Gardner et al. | 362/32 |
| 5,043,716 | 8/1991 | Latz et al. | 340/782 |
| 5,084,698 | 1/1992 | Sell | 340/701 |
| 5,136,287 | 8/1992 | Borenstein | 340/925 |

FOREIGN PATENT DOCUMENTS

| | | |
|---|---|---|
| 1238941 | 5/1988 | Canada. |
| 1250972 | 7/1989 | Canada. |
| 1269834 | 5/1990 | Canada. |
| 3535204A1 | 4/1986 | Fed. Rep. of Germany. |
| 3722578A1 | 1/1988 | Fed. Rep. of Germany. |

(List continued on next page.)

OTHER PUBLICATIONS

Wilford, W. T., Winston R., The Optics of Nonimaging Concentrators, Light and Solar Energy, Academic Press, 1978.

(List continued on next page.)

*Primary Examiner*—William L. Sikes
*Assistant Examiner*—Hung Xuan Dang
*Attorney, Agent, or Firm*—Longacre & White

[57] ABSTRACT

A nonimaging lens consists of a solid body of light-propagating material defining a first light-refracting surface, a second light-reflecting surface and a third light-refracting surface. To redirect the generally parallel light rays of a directional light beam, the first light-refracting surface diverges the light rays of this beam, the second surface reflects the divergent light rays, and the third surface refracts these reflected light rays. To concentrate dispersed light rays into a generally directional light beam, the third surface first refracts the light rays, the second light-reflecting surface converges these refracted light rays, and the first surface refracts the convergent light rays toward the generally directional light beam. In accordance with one embodiment, the first light-refracting surface and the second light-reflecting surface are conical, open out in opposite directions, and respectively define skewed refraction and reflection axes.

20 Claims, 6 Drawing Sheets

FOREIGN PATENT DOCUMENTS

| | | |
|---|---|---|
| 2441893 | 6/1980 | France . |
| 2547088 | 5/1983 | France . |
| 2631726 | 5/1988 | France . |
| 89/05463 | 11/1988 | PCT Int'l Appl. . |

OTHER PUBLICATIONS

Ning, X., Winston, R., O'Gallagher J., Dielectric Totally Internally Reflecting Concentrators, Applied Optics, vol. 26, No. 2, Jan. 15, 1987.

Winston, R., Principles of Solar Concentrators of a Novel Design, Solar Energy, vol. 16 on pp. 89-95 Permagon Press 1974.

Winston, R. & Hinterberger, H., Principles of Cylindrical Concentrators for Solar Energy, Solar Energy, vol. 17, pp. 255-258, Permagon Press 1975.

Rainhart, L. G. and Schimmel, W. P. Jr., Effect of Outdoor Aging on Acrylic Sheet Solar Energy, vol. 17, pp. 259-264. Permagon Press 1975.

Rabl, A. Comparison of Solar Concentrators, Solar Energy, vol. 18, pp. 93-111 Permagon Press 1976.

Mannan, K. D. and Cheema, L. S., Technical Note, Solar Energy, vol. 19, pp. 751-754, Permagon Press 1977.

Mills, D. R. and Giutronich, J. E., Asymmetrical Non-imaging Cylindrical Solar Concentrators, Solar Energy, vol. 20, pp.45-55, Permagon Press 1978.

Collares-Peireira, M., Rabl, A. and Winston, R., Lens-mirror Combinations with Maximal Concentration, Applied Optics, vol. 16, No. 10, Oct. 1977.

Harper, D. A., Hildebrand, R. H., Stiening, R. and Winston R., Heat Trap: an Optimized Far Infrared Field Optics System, Applied Optics, vol. 15, No. 1, Jan. 1976.

Rabl, A. and Winston, R., Ideal Concentrators for Finite Sources and Restricted Exit Angles, Applied Optics, vol. 15, No. 11, Nov. 1976.

Williamson, D. E., Cone Channel Concenser Optics, Journal of the Optical Society of America, vol. 42, No. 10, Oct. 1952.

Winston, R., Cone Collectors for Finite Sources, Applied Optics, vol. 17, No. 5, Mar. 1978.

Schuster, B. G. and Watson, R. D., Passive Optical Shutter for Reducing the Fluorescent Output of a Pulsed Ruby Laser, p. 419, Nov. 1967.

Russell, J. R., Butler, C. T. and Cantrell, E. S., Improved Seed Holder for Kyropoulos Apparatus, p. 1094, Mar. 1966.

Levi-Setti, R., Park, D. A. and Winston, R., The Corneal Cones of Limulus as Optimized Light Concentrators, Nature, vol. 253, pp. 115-116, Jan. 1975.

Hinterberger, H. and Winston, R., Use of a Solid State Funnel to Increase Phototube Aperture without Restricting Angular Acceptance, pp. 1217-1218, Apr. 1968.

Winston, R., Dielectric Compound Parabolic Concentrators, Applied Optics, vol. 15, No. 2, Feb. 1976.

Large Information Display Led Lamp, "Honeycomb Wide" (date unknown).

Winston, R., Ideal Flux Concentrators With Reflector Gap, Applied Optics, vol. 17, No. 11, pp. 1668-1669, Jun. 1, 1978.

Efficient Light Coupler for Threshold Cerenkov Counters, Hinterberger, H. and Winston, R.; p. 1094, Mar. 1966.

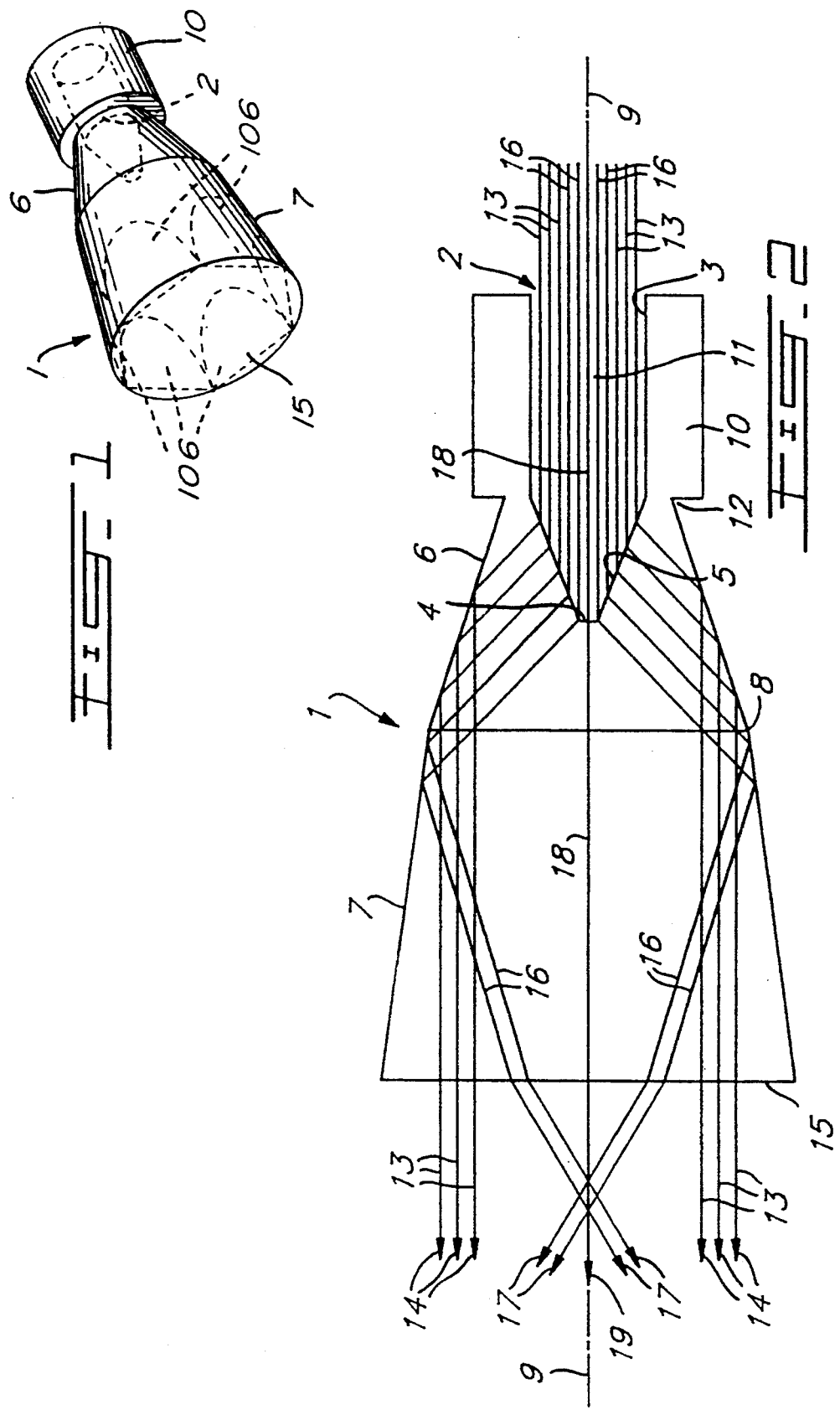

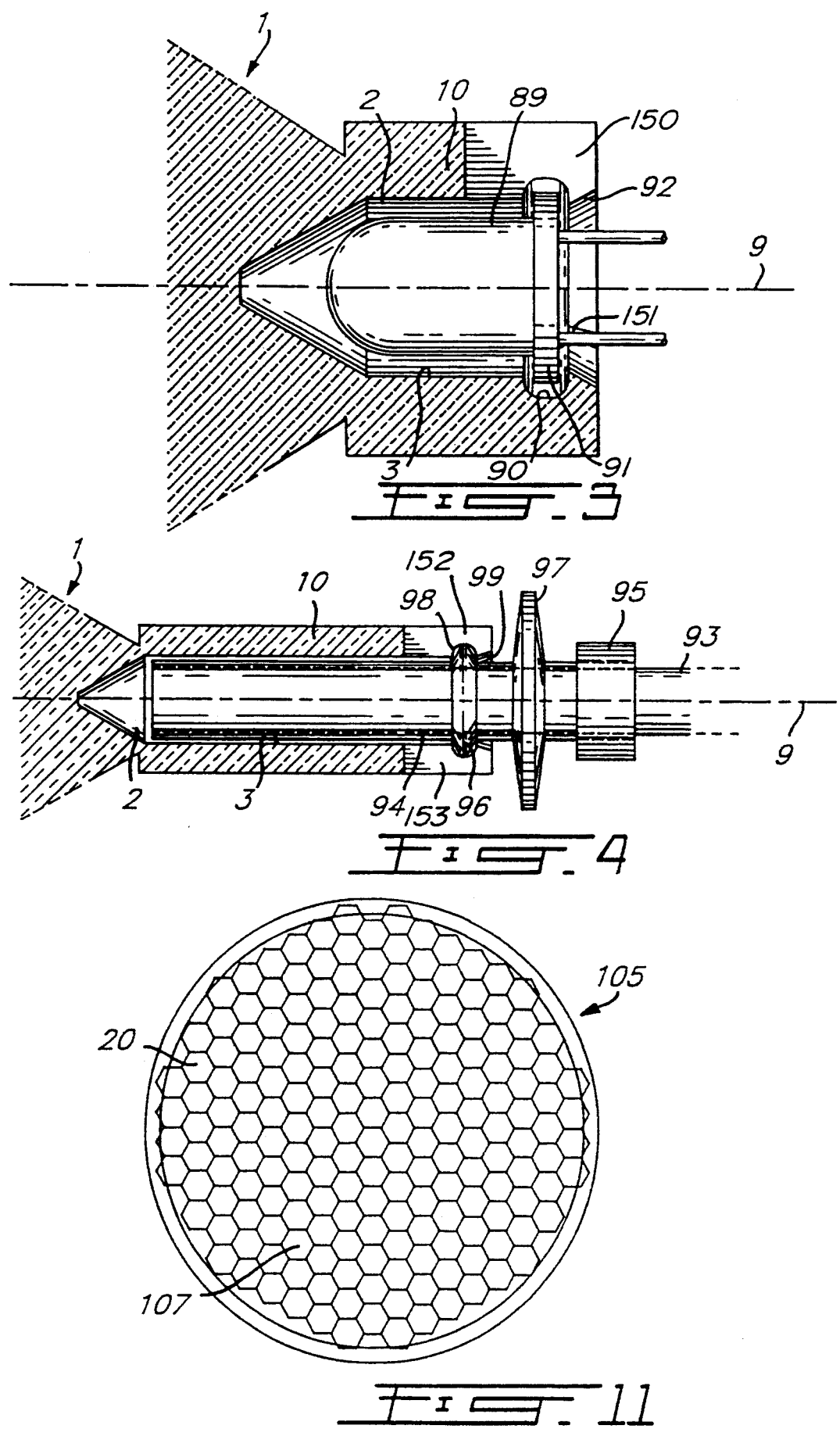

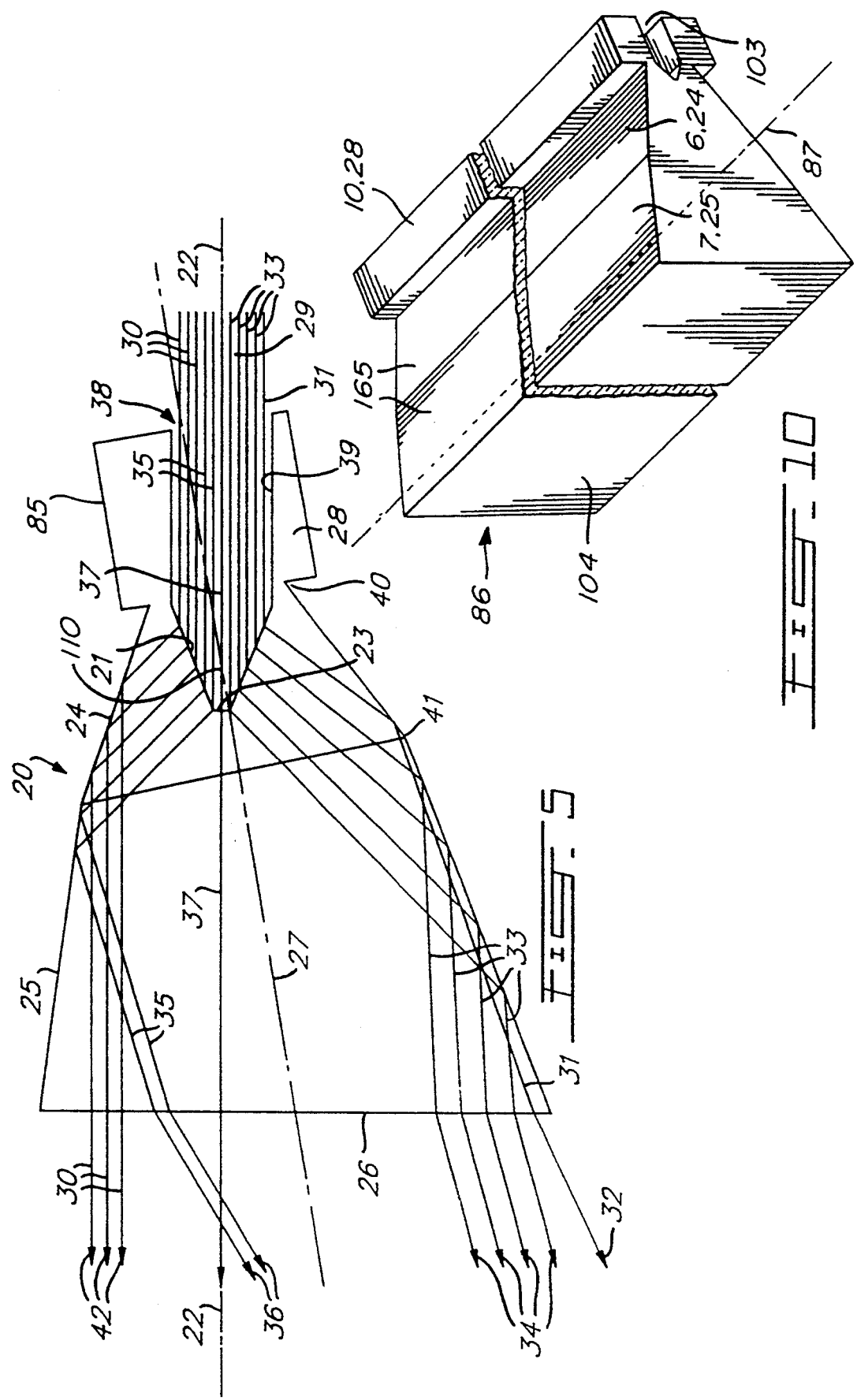

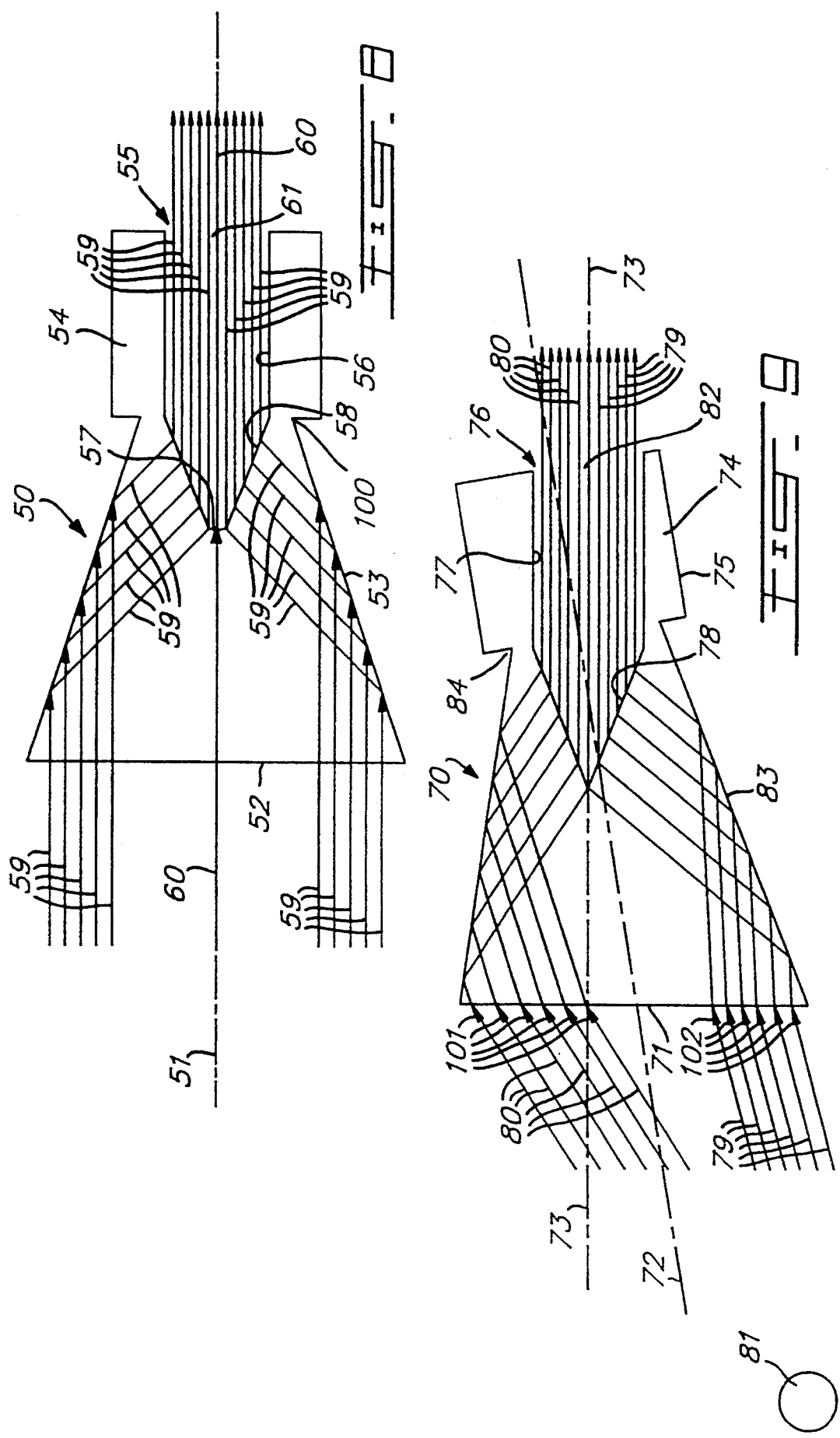

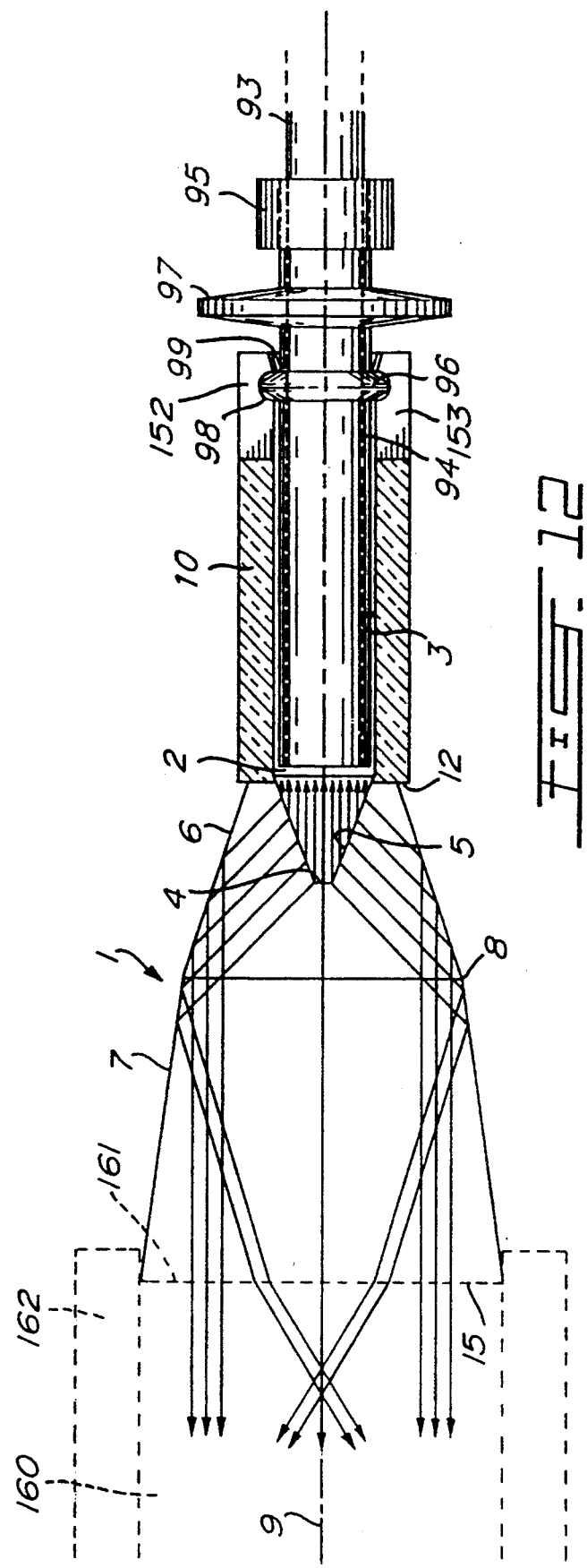

DOUBLE REFRACTION AND TOTAL REFLECTION SOLID NONIMAGING LENS

This application is a continuation in part of application Ser. No. 07/765,191, filed Sep. 25, 1991, now abandoned.

BACKGROUND OF THE INVENTION

1. Field of the Invention

The present invention relates to a solid nonimaging lens capable of both (a) redirecting the generally parallel light rays of a directional light beam as desired by means of a first refraction followed by a total reflection and eventually a second refraction, and (b) concentrating light rays into a generally directional light beam by means, eventually of a first refraction, followed by a total reflection and a second refraction.

2. Brief Description of the Prior Art

Nonimaging lenses consisting of a solid body of light-propagating material have been widely used in the past to control dispersion of light.

For example, the nonimaging lens of U.S. Pat. No. 2,908,197, granted to W. B. Wells et al. on Oct. 13, 1959, uses a total reflection followed by a refraction to control the dispersion of the light rays generated by an omnidirectional light source.

U.S. Pat. No. 4,521,835 (Meggs et al.) issued on Jun. 4, 1985, discloses a double refraction to control the dispersion of omnidirectional light rays emitted from a plurality of light-emitting diodes (LED's).

LED's capable of emitting a generally directional light beam of high luminous intensity, such as the LED HLMP 8100 manufactured and commercialized by the company Hewlett Packard, have been developed and are now available on the market. Obviously, the lens of Wells et al. and Meggs et al., designed for omnidirectional light sources, are inefficient when one wishes to obtain a specific pattern of dispersion of the generally parallel light rays of a directional light beam.

A new generation of lenses is accordingly required to enable efficient application of these high intensity LED's to various fields.

OBJECTS OF THE INVENTION

An object of the present invention is therefore to provide a nonimaging lens capable of successively refracting and reflecting the generally parallel rays of a directional light beam in order to redirect them as desired.

Another object of the invention is a nonimaging lens capable of successively reflecting and refracting light rays in order to concentrate these rays into a generally directional light beam.

SUMMARY OF THE INVENTION

More specifically, in accordance with the present invention, there is provided a nonimaging lens for redirecting generally parallel light rays of a directional light beam propagating outside but toward this lens. The nonimaging lens comprises a solid body of light-propagating material defining (a) a first light-refracting surface receiving the directional light beam and shaped to cause by refraction divergence of the generally parallel light rays, the divergent light rays propagating within the solid body, and (b) a second light-reflecting surface positioned to receive the divergent light rays and shaped to reflect these divergent light rays in order to redirect them as desired.

The solid body of the nonimaging lens according to the invention may further comprise a third surface through which the redirected light rays leave the solid body to propagate outside the nonimaging lens, this third surface being a light-refracting surface capable of refracting at least a part of the redirected light rays.

In accordance with preferred embodiments of the invention, the light-refracting surface defines a first geometrical Figure having a first axis, the light-reflecting surface defines a second geometrical Figure having a second axis, and the first and second axes are skewed;

the light-refracting and light-reflecting surfaces are generally conical and open out in generally opposite directions, the generally conical light-refracting surface is situated in the proximity of the end of smaller diameter of the generally conical light-reflecting surface, and the generally conical light-refracting and light-reflecting surfaces are centered on a common axis. Alternatively, the nonimaging lens comprises refraction and reflection skewed axes, the generally conical light-refracting surface being centered on the refraction axis, and the generally conical light-reflecting surface being centered on the reflection axis; and the solid body is elongated and extruded, the light-reflecting surface is longitudinal and has a generally V-shaped cross section, and the light-refracting surface is longitudinal and has also a generally V-shaped cross section.

The present invention is also concerned with a nonimaging lens for concentrating light rays into a generally directional light beam. This nonimaging lens comprises a solid body of light-propagating material propagating the light rays and defining (a) a first light-reflecting surface receiving the light rays propagating within the solid body and shaped to cause by reflection convergence of the light rays, the convergent light rays propagating within the solid body, and (b) a second light-refracting surface positioned to receive the convergent light rays and shaped to refract these convergent light rays to propagate them generally parallel to each other in the light beam itself propagating outside the nonimaging lens.

The solid body of the concentrating lens may further comprise a third surface through which the light rays to be concentrated, initially propagating outside but toward the solid body, penetrate this solid body. Preferably, this third surface is a light-refracting surface capable of refracting at least a part of the light rays penetrating the solid body.

Again, the light-reflecting surface may define a geometrical Figure having a first axis, and the light-refracting surface may define a geometrical Figure having a second axis, these first and second axes being skewed.

The present invention further relates to a method for redirecting generally parallel light rays of a directional light beam, comprising the steps of:

refracting the generally parallel light rays through a light-refracting surface of a solid body made of light-propagating material, to diverge the generally parallel light rays of the directional beam, the divergent light rays propagating within the solid body; and reflecting the divergent light rays on a light-reflecting surface of the solid body, to redirect them as desired.

Preferably, the redirecting method further comprises the step of refracting the redirected light rays through a third light-refracting surface through which the redirected light rays leave the solid body of light-propagating material.

Still further in accordance with the present invention, there is provided a method for concentrating light rays propagating within a solid body of light-propagating material, into a generally directional light beam. This method comprises the steps of:

reflecting the light rays on a light-reflecting surface of the solid body to converge these light rays, the convergent light rays propagating within the body; and refracting the convergent light rays through a light-refracting surface of the solid body to propagate them outside this solid body and generally parallel to each other into the generally directional light beam.

According to a preferred embodiment, the concentrating method further comprises the step of refracting the light rays to be concentrated, initially propagating outside but toward the solid body, through a third light-refracting surface of this solid body through which the light rays penetrate it.

The basic concept of the present invention consists of refracting the generally parallel light rays of a directional light beam to diverge these light rays, and of subsequently reflecting the divergent light rays in order to redirect them as desired. To concentrate light rays, a first reflection converges the light rays and these convergent light rays are subsequently refracted to form the generally directional light beam. Also in accordance with the present invention, the angle between the skewed refraction and reflection axes can be adjusted to contribute in obtaining the desired redirection or concentration of light rays.

The objects, advantages and other features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 1 is a perspective view of a first embodiment of the nonimaging lens in accordance with the present invention, capable of redirecting the generally parallel light rays of a directional light beam;

FIG. 2 shows the lateral profile of the nonimaging lens of FIG. 1, having a longitudinal axis of symmetry and an axial cavity defining a light-refracting surface;

FIG. 3 is a side elevational view, partially cross sectional, illustrating a light-emitting diode mounted in the cavity of the lens of FIGS. 1 and 2;

FIG. 4 is a side elevational view, partially cross sectional, illustrating the end of an optical fiber mounted in the axial cavity of the nonimaging lens of FIGS. 1 and 2;

FIG. 5 represents the lateral profile of a second embodiment of the nonimaging lens in accordance with the present invention, defining a pair of skewed refraction and reflection axes;

FIG. 8 is the lateral profile of a third embodiment of the nonimaging lens according to the invention, for concentrating light rays into a generally directional light beam;

FIG. 9 is the lateral profile of a fourth embodiment of the nonimaging lens in accordance with the present invention, having skewed refraction and reflection axes and capable of concentrating light rays into a generally directional light beam;

FIG. 10, which is disposed on the same sheet of formal drawings as FIG. 5, is a perspective view of an elongated, extruded nonimaging lens according to the present invention;

FIG. 11, which is disposed on the same sheet of formal drawings as FIGS. 3 and 4, illustrates a traffic signal light constructed with hexagonal lenses of the type shown in FIG. 5; and FIG. 12 is the lateral profile of a further embodiment of the nonimaging lens in accordance with the present invention, consisting of a solid body formed on or applied to the end of an optical fiber.

DETAILED DESCRIPTION OF THE PREFERRED EMBODIMENTS

Figure 6:
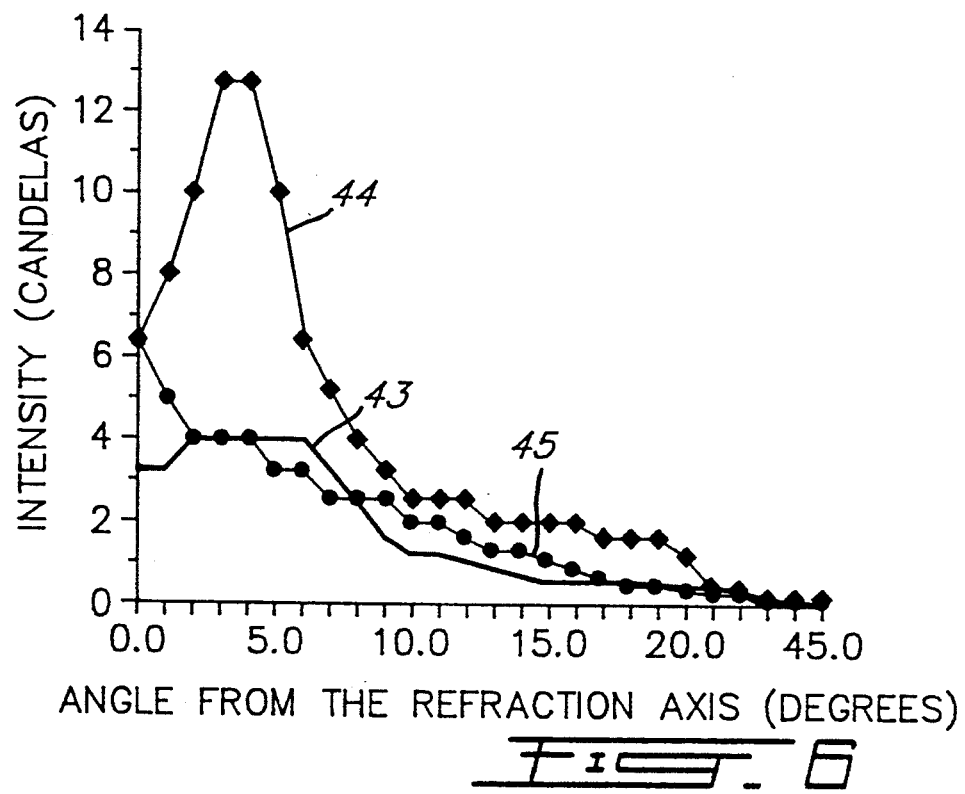
FIG. 6 is a graph showing the horizontal and vertical distributions of light intensity produced by the lens of FIG. 5.

FIGS. 1 and 2 of the appended drawings illustrate a first preferred embodiment of the nonimaging lens in accordance with the present invention, generally identified by the reference numeral 1.

The solid lens 1 consists of a solid body of light-propagating material presenting the general configuration of a cone (FIG. 1) and defining an axis of symmetry 9 (FIG. 2). The lens 1 comprises an end of smaller diameter defining an axial and cylindrical tubular portion 10. This tubular portion 10 comprises an axial cavity 2 opening at the end of smaller diameter of the lens 1 and defining a cylindrical surface 3 centered on the axis 9, a flat circular bottom 4 perpendicular to the axis 9, and a light-refracting surface 5 also centered on the axis 9 and presenting the shape of a truncated cone. As illustrated, the conical surface 5 interconnects one end of the cylindrical surface 3 with the periphery of the flat circular bottom 4.

The solid lens 1 further comprises a first light-reflecting surface 6 having the shape of a truncated cone. The conical surface 6 is centered on the axis 9 and is provided with an end of smaller diameter forming with the tubular portion 10 a circular neck 12. As can be seen, the conical light-refracting 5 and light-reflecting 6 surfaces open out in opposite directions.

A second light-reflecting surface 7 also presents the shape of a truncated cone. In the illustrated preferred embodiment, the light-reflecting surface 7 defines a solid angle smaller than the solid angle of the light-reflecting surface 6. The conical surface 7 is again centered on the axis 9 and has an end of smaller diameter connected to the end of larger diameter of the conical light-reflecting surface 6 through a circular edge 8. The conical light-reflecting surface 7 opens out in the same direction as the conical light-reflecting surface 6.

The end of larger diameter of the nonimaging solid lens 1 defines a circular light-refracting planar surface 15 perpendicular to the axis of symmetry 9.

A generally directional light beam 11, centered on the axis 9, propagates outside the solid body of the lens 1 toward the conical light-refracting surface 5. The light beam 11 is formed of a plurality of light rays each generally parallel to the axis 9.

As mentioned in the foregoing description, LED's capable of producing a generally directional light beam 11 of high luminous intensity are actually available on the market. An example is the LED HLMP 8100 manufactured and commercialized by the company Hewlett Packard. As shown in FIG. 3, a LED 89 can be mounted coaxial in the cavity 2 of the solid body of the nonimaging lens 1. The inner cylindrical surface 3 of the tubular portion 10 is formed with an annular groove 90 in which the flange 91 of the LED 89 can be "snap fit". The annular groove 90 is perpendicular to the axis 9 and situated close to the free end of the tubular portion 10. To facilitate insertion of the flange 91 in the annular groove 90, the surface 3 between the groove 90 and the free end of the tubular portion 10 is bevelled (see 92) and longitudinal slots such as 150 and 151 are peripherally distributed on the free end of the tubular portion 10. This "snap fit" arrangement enables both easy mounting and accurate positioning of the LED 89 in the cavity 2.

The generally directional beam 11 can also be applied to the light-refracting surface 5 through an optical fiber 93 (FIG. 4). One end of the fiber 93 is mounted in the cavity 2 of the nonimaging lens 1. The tubular portion 10 is lengthened and an annular groove 98 perpendicular to the axis 9 is made in the cylindrical surface 3 close to the free end of this tubular portion 10. The end of the optical fiber 93 is crimped in a tubular fiber optic connector 94 by means of a crimp ring 95. The outer surface of the connector 94 is formed with an annular ridge 96 and with an annular flange 97 facilitating handling of the connector 94 in which the optical fiber 93 has been crimped. This type of fiber optic connector is well known in the art and will not be further described. As shown in FIG. 4, the annular ridge 96 is "snap fit" in the annular groove 98 to mount the corresponding end of the optical fiber 93 in the cavity 2. To facilitate insertion of the ridge 96 in the annular groove 98, the surface 3 between the groove 98 and the free end of the tubular portion 10 is bevelled (see 99) and longitudinal slots such as 152 and 153 are peripherally distributed on the free end of the tubular portion 10. This "snap fit" arrangement enables both easy mounting and accurate positioning of the corresponding end of the optical fiber 93 in the cavity 2.

Alternatively, the generally directional light beam 11 can be a laser beam.

When the generally parallel light rays of the directional beam 11 reach the conical surface 5, they are refracted and diverge. As well known in the art, refraction of a light ray is caused by the different refractive indexes of two media through which the light ray successively propagates. In the example illustrated in FIGS. 1 and 2, refraction is caused by the difference between the refractive index of the atmosphere and the refractive index of the light-propagating material constituting the solid body of the nonimaging lens 1.

More specifically, outer light rays such as 13 are refracted by the conical surface 5 to propagate in the lens 1 toward the conical light-reflecting surface 6. When the rays 13 reach the light-reflecting surface 6, they are totally reflected to propagate in directions 14 generally parallel to the axis 9. The rays 13 pass without being refracted through the circular planar surface 15, in the periphery of this surface (the rays 13 are perpendicular to the surface 15).

The intermediate light rays such as 16 are also refracted by the conical light-refracting surface 5, totally reflected by the conical light-reflecting surface 7, and refracted again by the planar light-refracting surface 15 to propagate in directions 17.

Those skilled in the art will appreciate that the total reflection of the light rays on the conical light-reflecting surfaces 6 and 7 is caused by both the angle of incidence of the light rays and the difference between the refractive index of the atmosphere and the refractive index of the light-propagating material constituting the solid body of the nonimaging lens 1. No metallization of the conical light-reflecting surfaces 6 and 7 is required to totally reflect the light rays. However metallization of these surfaces can be envisaged to enhance the reflection.

The central rays such as 18 pass through the circular flat bottom 4 of the cavity 2 and the circular planar surface 15 without being refracted to therefore propagate in a direction 19 generally parallel to the axis 9.

Refraction through the light-refracting surface 5 diverge the generally parallel light rays of the directional light beam 11 whereby these light rays (13 and 16 in FIG. 2) can be reflected by the conical light-reflecting surfaces 6 and 7, and refracted again by the circular light-refracting surface 15. By shaping adequately the light-15, the light rays can be redirected as desired to produce for example an enlarged (wide or narrow) light beam visible with a generally even or variable brightness over substantially the entire surface 15 and over a given (wide or narrow) viewing angle. In the example of FIG. 2, light rays such as 18 are visible axially, light rays such as 13 are visible in a direction generally parallel to the axis 9 in the periphery of the circular surface 15, and light rays such as 16 are visible in directions 17 defining an angle with the axis 9.

Although FIG. 2 illustrates the pattern of propagation of the light rays of the beam 11 in the vertical plane including the axis 9, those skilled in the art will appreciate that this propagation pattern is still valid in any plane containing that axis.

FIG. 5 represents the second preferred embodiment 20 of the nonimaging lens in accordance with the present invention, comprising a pair of skewed refraction 22 and reflection 27 axes.

The solid lens 20 consists of a solid body of light-propagating material having the generally configuration of a cone, as shown in FIG. 1 for the first preferred embodiment 1 of the lens of the invention. The nonimaging lens 20 therefore comprises an end of smaller diameter provided with a tubular portion 28. This tubular portion 28 presents an outer cylindrical surface 85 centered on the reflection axis 27 and defines an inner cavity 38 centered on the refraction axis 22.

FIG. 5 shows skewed refraction 22 and reflection 27 axes lying in a common vertical plane. They indeed define a small acute angle in that plane.

The cavity 38 opens at the end of smaller diameter of the nonimaging lens 20, and defines a cylindrical surface 39 centered on the refraction axis 22, a flat circular bottom 23 perpendicular to the refraction axis 22, and a light-refracting surface 21 presenting the shape of a truncated cone centered on the refraction axis 22. The light-refracting surface 21 interconnects one end of the cylindrical surface 39 with the periphery of the circular flat bottom 23.

The solid lens 20 further comprises a light-reflecting surface 24 having the shape of a truncated cone, centered on the reflection axis 27, and presenting an end of smaller diameter defining with the tubular end portion 28 a circular neck 40. The conical light-refracting surface 21 and the conical light-reflecting surface 24 open out in generally opposite directions.

Another light-reflecting surface 25 has also the shape of a truncated cone and is centered on the reflection axis 27, but defines a solid angle smaller than the solid angle of the light-reflecting surface 24. As shown in FIG. 5, the light-reflecting surface 25 has an end of smaller diameter connected to the end of larger diameter of the conical surface 24 through a circular edge 41. As can be seen, the conical light-reflecting surface 25 opens out in the same direction as the conical light-reflecting surface 24.

The end of larger diameter of the solid lens 20 comprises a planar light-refracting surface 26 perpendicular to the refraction axis 22.

A generally directional light beam 29, centered on the refraction axis 22, propagates outside the solid body of the nonimaging lens 20 toward the conical light-refracting surface 21. The light beam 29 is formed of a plurality of light rays each generally parallel to the refraction axis 22.

The generally directional light beam 29 can be produced by a LED (not shown) mounted in the cavity 38 as shown in FIG. 3 with respect to nonimaging lens 1. Also, the beam 29 can be applied to the conical surface 21 through an optical fiber (not shown) having one end mounted in the cavity 38 as shown in FIG. 4 in relation to the nonimaging lens 1. It can further be a laser beam.

The light rays situated in the plane containing the skewed refraction and reflection axes 22 and 27 propagate as follows. The light rays such as 30 are refracted by the conical surface 21 to propagate toward the light-reflecting conical surface 24 where they are totally reflected in directions 42 generally parallel to the refraction axis 22. The light rays 30 pass through the light-refracting surface 26 without being refracted (the rays 30 are perpendicular to the surface 26).

The light rays such as 31 are refracted by the conical surface 21, totally reflected by the conical light-reflecting surface 24, and refracted again by the planar surface 26 to propagate in direction 32.

The intermediate light rays such as 33 are refracted by the conical light-refracting surface 21, totally reflected by the conical surface 25 and refracted again by the planar surface 26 to propagate in directions 34.

Concerning the intermediate light rays such as 35, they are refracted by the surface 21, totally reflected the surface 25 and refracted again by the surface 26 to propagate in directions 36.

The central light rays such as 37 pass through the flat bottom 23 and the planar surface 26 without being refracted to therefore propagate along the refraction axis 22.

Again, refraction by the conical surface 21 diverge the generally parallel light rays of the directional beam 29 whereby the rays such as 30, 31, 33 and 35 are reflected by the conical light-reflecting surfaces 24 and 25 before being refracted again by the planar surface 26. By shaping adequately the surfaces 21, 24, 25 and 26 while adjusting appropriately the angle between the skewed refraction 22 and reflection 27 axes, the light rays can be redirected as desired to produce for example an enlarged (wide or narrow) light beam visible with a generally even or variable brightness over substantially the entire surface 26 and over a given (wide or narrow) viewing angle. As can be appreciated, the effect of skewing the refraction and reflection axes 22 and 27 is to orient the viewing angle over which the enlarged light beam is visible in a given direction (downwardly in the example illustrated in FIG. 5). Obviously, the viewing angle can be oriented in any direction (downwardly, upwardly, laterally, etc.) by adjusting the angular position of the nonimaging lens 20 about the refraction axis 22.

FIG. 5 illustrates the pattern of propagation if the light rays in the plane including the refraction 22 and reflection 27 axes. Those skilled in the art will appreciate that this propagation pattern will change in other planes including the refraction axis 22. However, it is believed to be within the skill of an expert in the art to determine these patterns for each plane considered. In this respect, FIG. 6 is a graph showing the vertical and horizontal distribution of the luminous intensity for the nonimaging lens 20 of FIG. 5.

Curve 43 of the graph of FIG. 6 illustrates the distribution of the luminous intensity produced by the LED HLMP 8100 (see 89 in FIG. 3) manufactured and commercialized by the company Hewlett Packard, supplied with a current of 50 mA. As can be seen, the luminous intensity reduces rapidly as the angle (centered on the light source) between the optical axis (the longitudinal, geometrical axis) of the LED and the axis of vision increases.

Curve 44 of the same graph shows how the luminous intensity varies in a vertical plane including the skewed axes of the nonimaging lens 20 as the angle (centered on the point 110 of FIG. 5) between the refraction axis 22 and the axis of vision increases, with the point of view situated in the vertical plane but lower than the axis 22. As can be seen, the maximum luminous intensity is situated between the angles 0° and 7°.

Finally, curve 45 of the graph of FIG. 6 shows that the luminous intensity in the horizontal plane containing the refraction axis 22 gradually decreases as the angle between this axis 22 and the axis of vision increases.

Figure 7:
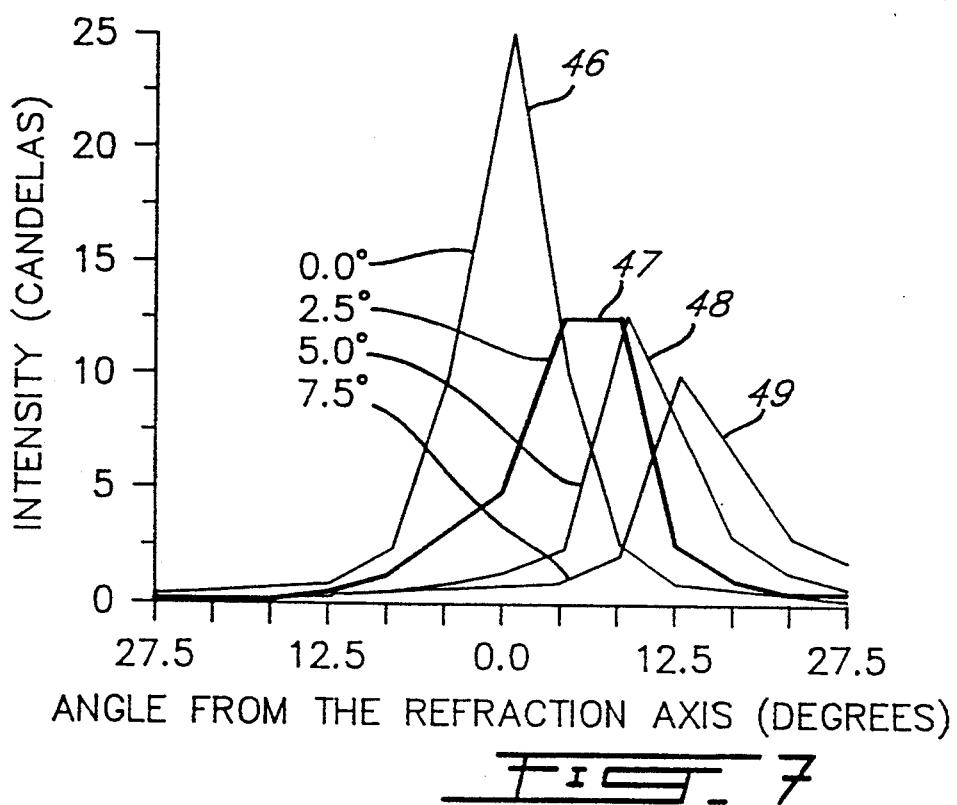
FIG. 7 is a graph shown the effect of skewing the refraction and reflection axes on the distribution of light intensity for the nonimaging lens of FIG. 5.

The graph of FIG. 7 shows the influence of the angle between the skewed axes 22 and 27 of the nonimaging lens 20 on the distribution of luminous intensity in the vertical plane including these two axes. The graph of FIG. 7 includes a curve 46 representative of the luminous intensity in the vertical plane for non skewed axes, a curve 47 representative of the luminous intensity in the vertical plane for an angle of 2.5° between the skewed axes, a curve 48 for an angle of 5.0° between the skewed axes, and a curve 49 representative of the luminous intensity in the vertical plane for an angle of 7.5°. It can be seen that skewing the axes 22 and 27 causes an angular displacement of the luminous intensity on the side of the refraction axis 22 on which the reflection axis 27 is skewed.

FIG. 8 illustrates a solid nonimaging lens 50 in accordance with the present invention, capable of concentrating generally parallel light rays 59 and 60 into a generally directional beam 61.

The nonimaging lens 50 consists of a solid body of light-propagating material having the general configuration of a cone, as lens 1 in FIG. 1. This lens 50 also defines an axis of symmetry 51. It comprises an end of larger diameter defining a circular planar surface 52 perpendicular to the axis of symmetry 51.

The nonimaging lens 50 further comprises a light-reflecting surface 53 having the shape of a truncated cone centered on the axis 51, the planar surface 52 being situated at the end of larger diameter of this surface 53.

The end of smaller diameter of the solid nonimaging lens 50 is provided with an axial tubular portion 54. This tubular portion 54 is formed with an axial cavity 55 opening at the end of smaller diameter of the lens 50 and defining a cylindrical surface 56 centered on the axis 51, a flat circular bottom 57 perpendicular to the axis 51, and a light-refracting surface 58 presenting the shape of a truncated cone centered on the axis 51. As can be seen, the conical surface 58 interconnects one end of the cylindrical surface 56 with the periphery of the circular flat bottom 57. Also, the conical light-refracting surface 58 and the conical light-reflecting surface 53 open out in opposite directions.

The tubular portion 54 forms with the end of smaller diameter of the conical light-reflecting surface 53 a circular neck 100.

Light rays such as 59 and 60, propagating generally parallel to the axis 51, are concentrated into a generally directional light beam 61. The central light rays such as 60 pass through the planar surface 52 and the flat circular bottom 57 without being refracted to form the central rays in the beam 61. The generally parallel light rays 59, propagating through the planar surface 52 without being refracted (the light rays 59 are perpendicular to the surface 52) are totally reflected on the conical light-reflecting surface 53 to converge toward the light-refracting surface 58 where they are refracted to propagate outside the lens body in the beam 61 parallel to the axis 51. The nonimaging lens 50 accordingly concentrates the light rays 59 and 60 into a generally directional beam 61 presenting a generally constant light intensity over its cross section, the solid angles of the conical surfaces 53 and 58 being obviously selected for that purpose.

Although FIG. 8 illustrates the pattern of propagation of the light rays 59 and 60 in the vertical plane including the axis 51, those skilled in the art will appreciate that this propagation pattern is still valid in any plane containing that axis.

FIG. 9 is a further preferred embodiment 70 of the nonimaging lens in accordance with the present invention, comprising skewed refraction 73 and reflection 72 axes. The lens 70 has been designed to concentrate divergent sets of generally parallel light rays 79 and 80, emitted by a single omnidirectional source 81, into a generally directional beam 82.

The solid lens 70 again consists of a solid body of light-propagating material having the general configuration of a cone, as illustrated in FIG. 1 for nonimaging lens 1. The lens 70 therefore comprises an end of larger diameter forming a planar light-refracting surface 71 perpendicular to the refraction axis 73.

The nonimaging lens 70 further comprises a light-reflecting surface 83 having the shape of a truncated cone and centered on the reflection axis 72, the planar light-refracting surface 71 being situated at the end of larger diameter of the conical surface 83.

As illustrated in FIG. 9, the refraction 73 and reflection 72 axes are skewed optical axes situated in a common plane and defining a small acute angle in that plane.

The end of smaller diameter of the nonimaging lens 70 comprises a tubular portion 74. This tubular portion 74 has an outer cylindrical surface 75 centered on the reflection axis 72 and an inner cavity 76 centered on the refraction axis 73 and opening at the end of smaller diameter of the lens 70.

The inner cavity 76 itself defines a cylindrical surface 77 and a bottom conical light-refracting surface 78 both centered on the refraction axis 73. As can be seen, the conical light-refracting surface 78 and the conical light-reflecting surface 83 open out in generally opposite directions.

FIG. 9 shows the end of smaller diameter of the conical light-reflecting surface 83 defining a circular neck 84 with the tubular portion 74.

The solid lens 70 is capable of concentrating the divergent sets of generally parallel light rays 79 and 80, into the generally directional light beam 82. More specifically, the light rays 80, propagating in directions 101, are refracted by the planar surface 71, totally reflected by the conical surface 83 to propagate toward the conical surface 78 where they are refracted to propagate generally parallel to the refraction axis 73 in the beam 82 itself propagating outside the solid body of lens 70. Light rays 79, propagating in directions 102, are refracted by the planar surface 71, totally reflected by the conical surface 83 to propagate toward the conical surface 78 where they are refracted again to propagate generally parallel to the axis 73 in the light beam 82. Obviously, the solid angles of the conical surfaces 78 and 83 as well as the acute angle between the skewed axes 72 and 73 are selected for that purpose.

FIG. 9 illustrates the pattern of propagation of the light rays from the source 81 in the vertical plane including the refraction 73 and reflection 72 axes. Those skilled in the art will appreciate that this propagation pattern will change in other planes including the refraction axis 73. However, it is believed to be within the skill of an expert in the art to determine these patterns for each plane considered and accordingly, they will not be illustrated in the present application.

As an example, the nonimaging solid lens 70 illustrated in FIG. 9 can be used to collect light from the sun (source 81) as it displaces in the sky. It concentrates the light rays in the generally directional beam 82 transmitted through one or many optical fibers to a solid lens such as 1 (FIG. 2) or 20 (FIG. 5) which redirects the transmitted light beam for example to light the interior of a building. The ends of the optical fiber(s) can of course be mounted in the cavities of the corresponding nonimaging lenses as shown in FIG. 4.

As illustrated in FIG. 12, the nonimaging lens 1 of FIGS. 1 and 2 can be formed integrally on one end of an optical fiber 160 (the lens 1 then comprises no light-refracting surface 15). Alternatively, the circular planar surface 15 of the nonimaging lens 1 can be applied to a flat, circular end recess 161 of an optical fiber 162 of larger diameter or to the end surfaces of a bundle of optical fibers. Mounted in the cavity 2 of the nonimaging FIG. 4. Of course, the optical fiber 93 may be replaced by a bundle of optical fibers. The nonimaging lens of FIG. 12 constitutes a nonimaging matching lens capable of interconnecting two optical fibers of different diameters, two bundles of optical fibers of different diameters, or an optical fiber and a bundle of optical fibers having respective different diameters. As illustrated, the nonimaging matching lens is capable of coupling the optical fiber(s) and/or bundle(s) in both directions without noticeable losses. An application of the arrangement of FIG. 12 is the coupling of acrylic optical fibers with glass optical fibers, the acrylic fibers having a larger diameter than the glass ones. When the optical fiber 93 is replaced by the LED 89 mounted in the cavity 2 as shown in FIG. 3, the nonimaging matching lens will transmit without noticeable losses the luminous intensity from the LED 89 to the optical fiber 160 or 162, or toward the bundle of optical fibers. The losses of luminous intensity at the input of the optical fiber(s) is thereby eliminated.

Although FIGS. 1 to 9 and 12 of the appended drawings illustrate nonimaging lenses having the general configuration of a cone, other configurations can eventually be envisaged. For example, FIG. 10 shows a nonimaging lens 86 consisting of an elongated, extruded solid body. This lens 86 may present the profile of FIGS. 2, 5, 8 or 9. The light-refracting and light-reflecting surfaces then have respective V-shaped cross sections. The V-shaped light-reflecting surface may present, as shown in FIG. 10, a pair of angular surface portions such as 165.

When the nonimaging lens 86 presents the profile of FIGS. 2 or 5 and when the longitudinal cavity 103 is supplied with a generally directional light beam (pencil of light), the pattern of propagation of the light rays in each plane perpendicular to the longitudinal axis 87 will be that illustrated in FIGS. 2 or 5, respectively.

In the same manner, when the nonimaging lens 86 has the profile of FIGS. 8 or 9 and its front surface 104 is supplied with light rays such as 59–60 (FIG. 8) or 79–80 (FIG. 9), the pattern of propagation of these light rays in each plane perpendicular to the longitudinal axis 87 will be that illustrated in FIGS. 8 or 9, respectively.

A particular, very interesting application of the lens 20 of FIG. 5 is its use in the construction of a traffic signal light 105 shown in FIG. 11.

As shown in dashed lines in FIG. 1 for the nonimaging lens 1, portions 106 can be removed from the end of larger diameter of the nonimaging lens 20 of FIG. 5 to form an hexagonal cross section. As can be appreciated, the removed portions 106 do not affect substantially the performances of the lens 20. A plurality of these hexagonal lens 20 can be mounted closely adjacent to each other in a honeycomb arrangement (see FIG. 11) to form the traffic signal light 105. The front, light-refracting surfaces 26 of the lenses 20 define a single planar surface 107 (FIG. 11) which greatly facilitates cleaning of the traffic signal light 105. In this respect, it can be appreciated that a flat surface is more difficult to soil.

An alternative is to mold the plurality of closely adjacent lens 20 into a single piece of light-propagating plastic material to form the traffic signal light 105. In this case, the honeycomb arrangement subsists and is still apparent. The front surface 107 of this molded traffic signal light 105 may also be slightly convex.

Of course, a LED is mounted in the cavity 38 of each lens 20, as shown in FIG. 3. These LED's are simultaneously energized to illuminate the traffic signal light 105.

The lenses 20 used in the construction of the traffic signal light 105 of FIG. 11 have their parameters (light-refracting surface 21, light-reflecting surfaces 24 and 25, angle between the skewed axes 22 and 27) adjusted to meet as closely as possible with the governmental regulations in the orientation and intensity of the light rays.

The installation of traffic signal lights such as 105 will present the advantage of considerably reducing the consumption of electric energy.

The nonimaging lens 1, 20, 50 and 70 may be made of molded acrylic resin, while the solid lens 86 can be made of extruded acrylic resin. Obviously, the invention is not limited to the use of acrylic resin. Of course, other types of light-propagating materials, including glass, can be envisaged.

It should be pointed out that all the nonimaging lenses described in the foregoing description are bidirectional; they are capable of propagating light rays in both directions.

Although the present invention has been described hereinabove by way of preferred embodiments thereof, such embodiments can be modified at will, within the scope of the appended claims, without departing from the spirit and nature of the subject invention. For example, the following modifications, amongst others, can be made:

the light-reflecting surfaces 6, 7, 24, 25, 53, 83 and 165 may be metallized to enhance light reflection;

the planar light-refracting surfaces 15, 26, 52, 71 and 104 may be formed with prisms, Fresnel lens, etc. to produce any desired refraction patterns. They are not necessarily planar and/or perpendicular to an optical axis;

the conical light-refracting surfaces 5, 21, 58 and 78 may present any concave or convex configurations and may be formed with prisms, Fresnel lens, etc. to produce any desired refraction pattern;

the conical light-refracting and light-reflecting surfaces 5;6, 21;24, 58;53 and 78;83 can open out generally in the same direction. The light-refracting surfaces 5, 21, 58 and 78 are then convex;

the light-refracting and light-reflecting surfaces 5;6, 21;24, 58;53 and 78;83 are not necessarily surfaces of revolution;

the light-refracting and light-reflecting surfaces 5;6, 21;24, 58;53 and 78;83 can be hemispheric, elliptic, non symmetric, pyramidal, parabolic, flat with Fresnel lens, etc.;

a diffusant can be mixed with at least a portion of the light-propagating material forming the solid body of the nonimaging lens to diffuse the light rays and enable for example use of the lens as a light source; and generally, the light-refracting and light-reflecting surfaces 5;6, 21;24, 58;53 and 78;83 have a configuration selected to redirect as desired the generally parallel light rays of the directional beam.

What is claimed is:

1. A traffic signal light comprising:
    a plurality of nonimaging lens mounted laterally adjacent to each other; and
    a plurality of light beam sources (a) each producing a directional light beam formed of generally parallel light rays and (b) each associated with one of said nonimaging lens;
    wherein each of said nonimaging lens comprises a solid body of light-propagating material defining:
        a first light-refracting surface receiving the directional light beam of the associated source and having a configuration adapted to cause divergence of the generally parallel light rays of the received light beam by refraction, the divergent light rays propagating within the solid body; and
        a second light-reflecting surface positioned to receive the divergent light rays and having a configuration adapted to reflect said divergent light rays;
    wherein the configuration of said light-refracting surface and the configuration of said light-reflecting surface are selected to redirect the generally parallel light rays from the associated light beam source into an enlarged light beam propagating in a given direction and visible over a given viewing angle.

2. A traffic signal light according to claim 1, wherein said solid body of each nonimaging lens further comprises a third surface through which the redirected light rays leave said solid body to propagate outside the nonimaging lens.

3. A traffic signal light according to claim 2, wherein the third surface is a light-refracting surface capable of refracting at least a part of the redirected light rays.

4. A traffic signal light according to claim 1, wherein each of said nonimaging lens comprises a refraction axis and a reflection axis, wherein said refraction and reflection axes are skewed, and wherein said light-refracting surface defines a first geometrical Figure centered on said refraction axis, and wherein said light-reflecting surface defines a second geometrical Figure centered on said reflection axis.

5. A traffic signal light according to claim 1, wherein the solid body of each nonimaging lens is generally conical and comprises an end of larger diameter presenting an hexagonal cross section, whereby each nonimaging lens is adapted to be assembled with the laterally adjacent lenses in a honeycomb arrangement.

6. A traffic signal light according to claim 1, wherein said plurality of nonimaging lenses mounted laterally adjacent to each other are molded into a single piece of plastic material.

7. A traffic signal light according to claim 1, wherein said light-refracting and light-reflecting surfaces are generally conical and open out in generally opposite directions, wherein the generally conical light-reflecting surface has an end of smaller diameter, and wherein the generally conical light-refracting surface is situated in the proximity of the end of smaller diameter of said light-reflecting surface.

8. A traffic signal light according to claim 7, in which the generally conical light-refracting and light-reflecting surfaces are centered on a common axis.

9. A traffic signal light according to claim 7, wherein the generally conical light-reflecting surface comprises two surface portions (a) both presenting the general configuration of a truncated cone, (b) opening out generally in the same direction, (c) defining solid angles of different values, and (d) interconnected through an annular edge.

10. A nonimaging lens for receiving generally parallel light rays of a directional light beam propagating outside but toward said lens and for redirecting said light rays to produce an enlarged light beam propagating in a given direction and visible over a given viewing angle, said nonimaging lens comprising a solid body of light-propagating material defining:
  a first light-refracting surface receiving the directional light beam and having a configuration adapted to cause divergence of said generally parallel light rays by refraction, the divergent light rays propagating within the solid body; and
  a second light-reflecting surface positioned to receive the divergent light rays and having a configuration adapted to reflect said divergent light rays;
wherein the configuration of said light-refracting surface and the configuration of said light-reflecting surface are selected to redirect said generally parallel light rays into said enlarged light beam propagating in said given direction and visible over said given viewing angle.

11. A nonimaging lens according to claim 10, wherein said solid body further comprises a third surface through which the redirected light rays leave said solid body to propagate outside the nonimaging lens.

12. A nonimaging lens according to claim 11, wherein the third surface is a light-refracting surface capable of refracting at least a part of said redirected light rays.

13. A nonimaging lens according to claim 10, wherein said light-refracting surface defines a first geometrical Figure having a first axis, wherein said light-reflecting surface defines a second geometrical Figure having a second axis, and wherein said first and second axes are skewed.

14. A nonimaging lens according to claim 13, comprising a refraction axis formed by said first axis, and a reflection axis formed by said second axis.

15. A nonimaging lens according to claim 10, wherein said light-refracting and light-reflecting surfaces are generally conical and open out in generally opposite directions, wherein the generally conical light-reflecting surface has an end of smaller diameter, and wherein the generally conical light-refracting surface is situated in the proximity of the end of smaller diameter of said light-reflecting surface.

16. A nonimaging lens according to claim 15, in which the generally conical light-refracting and light-reflecting surfaces are centered on a common axis.

17. A nonimaging lens according to claim 10, wherein the light-reflecting surface is generally conical and comprises two surface portions (a) both presenting the general shape of a truncated cone, (b) opening out generally in the same direction, (c) defining solid angles of different values, and (d) interconnected through an annular edge.

18. A nonimaging lens according to claim 10, wherein said solid body is elongated and extruded, wherein said light-refracting surface is longitudinal and has a generally V-shaped cross section, and wherein the light-reflecting surface is longitudinal and has a generally V-shaped cross section.

19. A method for redirecting generally parallel light rays of a directional light beam into an enlarged light beam propagating in a given direction and visible over a given viewing angle, comprising the steps of:
  refracting said generally parallel light rays through a light-refracting surface of a solid body made of light propagating material, to diverge said generally parallel light rays of the directional beam, the divergent light rays propagating within the solid body; and
  reflecting the divergent light rays on a light-reflecting surface of said solid body;
wherein said light-refracting and light-reflecting surfaces have respective configurations selected to redirect said generally parallel light rays into said enlarged light beam propagating in said given direction and visible over said given viewing angle.

20. A method as recited in claim 19, further comprising the step of refracting the redirected light rays through a third light-refracting surface through which the redirected light rays leave said solid body of light-propagating material.

* * * * *